United States Patent [19]

Müller

[11] 4,219,420

[45] Aug. 26, 1980

[54] ARRANGEMENT FOR AND A PROCESS OF FILTERING A CONTAMINATED MEDIUM

[75] Inventor: Hans Müller, Erlenbach, Switzerland

[73] Assignee: Chemap AG, Maennedorf, Switzerland

[21] Appl. No.: 10,884

[22] Filed: Feb. 9, 1979

[30] Foreign Application Priority Data

Mar. 2, 1978 [CH] Switzerland .......................... 2264/78

[51] Int. Cl.² ...................... B01D 29/08; B01D 29/38; B01D 37/00
[52] U.S. Cl. .................................... 210/82; 210/411; 210/446; 210/483; 210/500 R
[58] Field of Search .................... 210/65, 82, 411, 446, 210/483, 500, 503–505, 508, 509; 55/514, 527, 528

[56] References Cited

U.S. PATENT DOCUMENTS

| 605,234 | 6/1898 | Sherk | 55/527 X |
| 1,833,315 | 11/1931 | Burhans | 210/499 |
| 3,240,344 | 3/1966 | Hoelscher | 210/340 |
| 3,589,521 | 6/1971 | Richter | 210/411 |
| 3,632,415 | 1/1972 | Franklin et al. | 210/509 X |
| 3,815,341 | 6/1974 | Hamano | 55/514 X |

Primary Examiner—William A. Cuchlinski, Jr.
Attorney, Agent, or Firm—Michael J. Striker

[57] ABSTRACT

A hollow filter housing is provided with a support and a plurality of fiber bundles located on the support. The fibers extend within the filter housing in direction between an inlet and an outlet of the housing. The contaminated medium is introduced into the housing through the inlet in a direction towards the outlet to flow past the plurality of the fiber bundles. The contaminated medium becomes filtered as it passes through the filter bundles without compressing the latter against the support.

31 Claims, 6 Drawing Figures

ARRANGEMENT FOR AND A PROCESS OF FILTERING A CONTAMINATED MEDIUM

BACKGROUND OF THE INVENTION

The present invention relates to filters. More particularly, the present invention concerns a process and an arrangement for filtering a contaminated medium by a brush filter.

It is known in the prior art (see German Offenlegungsschrift 27 45 526) to filter a contaminated medium (i.e., liquid or gas) by means of a fiber material. The fiber material (i.e., a plurality of fibers) may be fixed, at one side thereof, on a plate having a plurality of holes, on a tube, etc. During the filtration process the contaminated medium is introduced into a filter housing in a direction towards and against the support (i.e. plate, tube, etc.) of the fibers. The fibers thereby become compressed together and compacted against the support to form a filter bed. In order to clean the fiber material a cleaning medium back-flushes the fibers so as to straighten them out in a direction opposite to that of the flow of the contaminated medium. During the back-flushing any filter cake accumulated on the filter bed is removed therefrom and the filter can then be re-used.

It has been recognized that this construction is not satisfactory, since the compressed fibers are too compact to be satisfactorily backflushed and cleaned of the accumulated filter cake. Obviously, this disadvantageous feature adversely affects the effectiveness of such a brush filter, since it is difficult to clean.

SUMMARY OF THE INVENTION

It is a general object of the present invention to avoid the disadvantages of the prior art arrangements for and process for filtering a contaminated medium.

More particularly, it is an object of the present invention to provide such an arrangement for and a process for filtering a contaminated medium, which ensures that even the smallest contaminated particles are separated from the contaminated medium during the filtration process.

Another object of the present invention is to provide an arrangement for and a process for filtering a contaminated medium, which guarantees the best filtering efficiency of the brush filter due to a "depth effect" when the contaminated medium passes through the fibers.

In pursuance of these objects and others which will become apparent hereafter, one feature of the present invention resides in providing a process for filtering a contaminated medium, comprising the steps of connecting a plurality of elongated fiber bundles to a support within an elongated filter housing having an inlet and an outlet spaced from said inlet so that the filter bundles extend parallel to the path between said inlet and outlet of said filter housing. A contaminated medium is introduced into said housing through said inlet in a direction towards said outlet past said plurality of fiber bundles. The contaminated medium is filtered as it passes through the fiber bundles, but does not compress them against the support to which they are attached. The filter medium is then withdrawn from the housing through its outlet.

Another object of the present invention resides in providing an arrangement for filtering a contaminated medium, comprising a hollow filter housing having an interior, inlet means for introducing a contaminated medium into said interior of the housing and outlet means for withdrawing a filtered medium from the interior of the housing. Filtering means are located within the interior of said housing and include a plurality of filtering fibers extending parallel to the path between said inlet and outlet means. The filtering fibers in prior-art filters tend to become undesirably compressed under pressure resulting during the filtering process as the contaminated medium passes through said filtering fibers in said direction between said inlet and outlet means. To avoid this there are further provided means for substantially preventing such compression of said filtering fibers during the filtering process.

The arrangement is further provided with additional inlet and outlet means for introducing into and withdrawing from the housing a back-flushing medium for back-flushing (i.e. cleaning) from the fibers the filter cake accumulated thereon during the filtering process. The back-flushing medium is introduced into the housing in another direction which is advantageously opposite to said direction of introducing the contaminated medium to be filtered.

It has been recognized that fiber bundles having length between 300 mm and 2000 mm are especially preferable in order to obtain the best filtering results. It has also been recognized that in order to increase the effectiveness of the filter, it is advantageous to remove all relatively short fibers from the fiber bundles. In other words, the fewer short fibers in the fiber bundles, the better the filtering results of the brush filter. During the filtering process, the flow of the contaminated medium (i.e., liquid or gas) does not significantly compress the fibers. The "depth effect" of the fiber bundles during the process in this invention is similar to that which is observed in sand-bed filters. The fibers impede (i.e., arrest) the contaminated particles from the contaminated medium as the medium passes through the bundles from the said inlet means to said outlet means. The contaminated particles may adhere to the fibers, engage the fibers due to an electrostatic effect, or become arrested between the fibers by way of a conventional sieve effect. It is especially advantageous to use spinning cable for the fibers. A dry-spinning nozzle arrangement or a spinning bath may be used for manufacturing the spinning cable. The fibers may be of synthetic plastic material such as polyester, nylon, polyvinylchloride, polyacrylonitrile, viscose and the like. The fibers may be fixed within the hollow housing on plates having a plurality of holes. Instead of the plates there can be used rods or tubes.

In order to improve the "depth effect" of the fiber bundles and to further prevent any compression of the fibers in the bundles, the fibers may have different length, which fact leads to a side penetration of the contaminated particles inside the fiber bundles.

In accordance with another embodiment of the present invention, the lower end portions of at least some fibers are connected to each other in groups. Each group thus formed may be weighted down. The groups of the lower end portions of the fibers may be connected by strings or springs to corresponding projections on the inner surface of the filter housing at the lower portion thereof. Obviously, the force of gravity of the weights or the biasing force of the strings or the springs connecting the groups of the end portions of the fibers to the projections at the lower portion of the inner surface of the filter housing additionally prevent compression of the fibers against the support under pressure of the contaminated medium passing through the fibers in direction from the inlet towards the outlet of the filter housing.

At the same time the lower end portions of the fibers in each group are pressed against each other in direction transversely to the elongation of the filter housing, so as to form a tightened filter bed. Such an arrangement considerably increases the filtering effectiveness of the filtering fiber bundles during the filter process.

Should the filtering surface of the brush filter be relatively large, it is preferable to provide the contaminated medium inlet and outlet means and the back-flushing medium inlet and outlet means with nozzles in order to improve distribution of the contaminated and back-flushing medium inside the interior of the filter housing and between the filtering fibers.

In order to further increase the filtering effectiveness of the fibers they may be subjected to a chemical treatment in order to roughen the contacting surfaces of the fibers.

The cross-sectional dimension (i.e., thickness) of different fibers in the fiber bundles may be the same (i.e., of one and the same magnitude). However, in order to increase the filtering effectiveness, it is advantageous to provide the fibers of different thickness in the same fiber bundles.

The fiber bundles may be back-flushed simultaneously, but backflushing efficiency may be increased by dividing the bundles into groups and backflushing each group individually, one after another, until all the groups are backflushed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
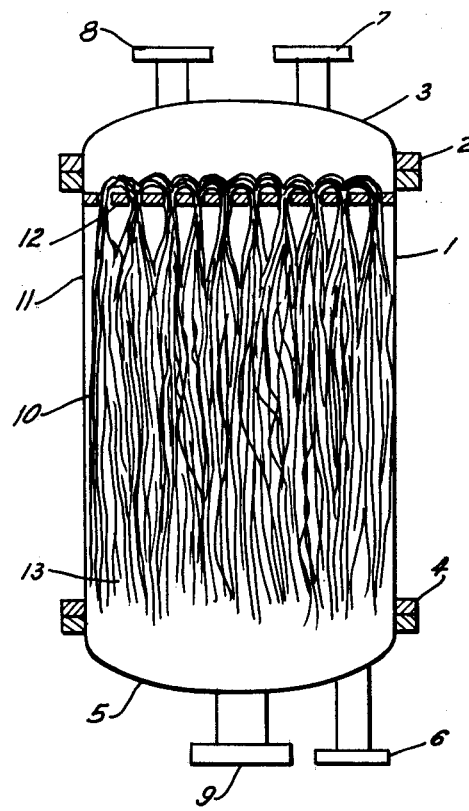
FIG. 1 is a longitudinal sectional view of a brush filter in accordance with the present invention.

Referring now to the drawings and first to FIG. 1 thereof, it may be seen that the reference numeral 1 designates a hollow filter housing which is closed from above through a flange 2 by means of a closure 3. The filter housing 1 is closed from below through a flange 4 by a closure 5. Thus, the hollow housing 1, the upper closure 3 and the lower closure 5 constitute together the interior of a filter. The filter housing 1 is provided at the lower portion thereof (namely at the lower closure 5) with an inlet pipe connection 6. A contaminated medium (i.e., liquid or gas) is introduced into the interior of the filter housing 1 through the inlet pipe connection 6.

The filter housing 1 is further provided at the upper part thereof (i.e., at the upper closure 3) with an outlet pipe connection 7. The filtered medium is withdrawn from the interior of the filter housing 1 through the outlet pipe connection 7. The upper closure 3 is further provided with another inlet pipe connection 8. A back-flushing medium is introduced into the interior of the filter housing 1 through the inlet pipe connection 8 when it is necessary to back-flush the filter cake accumulated in the interior of the filter housing 1 during the filtering process. The back-flushing medium may be gas or liquid. The filter housing 1 is further provided (e.g., at the lower closure 5) with another outlet pipe connection 9 for withdrawing therethrough the back-flushing liquid and the filter cake from the interior of the filter housing 1.

The interior of the filter housing 1 is provided with filtering means which are constituted by a plurality of fiber bundles 10. Each fiber bundle 10 is fixed within the interior of the filter housing 1 in a respective hole 11 of a support 12. The support 12 extends transversely to the longitudinal axis of the filter housing 1. The fiber bundles 10 are fixed on the support 12 by means which are well-known per se and, therefore, are not described in detail. The fibers 13 of the fiber bundles 10 extend along the elongation of the filter housing 1 in a direction from the outlet pipe connection 7 towards the inlet pipe connection 6. The fibers 13 extend substantially through the whole section of the cylindrical filter housing 1 so that only one-third of the lower portion of the filter housing 1 remains empty.

Figure 2:
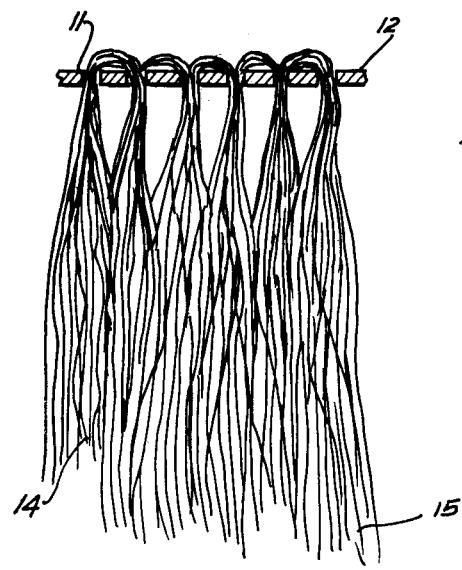
FIG. 2 is a longitudinal view of filtering means separated from the brush filter shown in FIG. 1.

FIG. 2 shows another embodiment of the fiber bundles. In accordance with this embodiment the fibers have different length, in other words, each fiber bundle includes comparatively short fibers 14 and comparatively long fibers 15.

Figure 3:
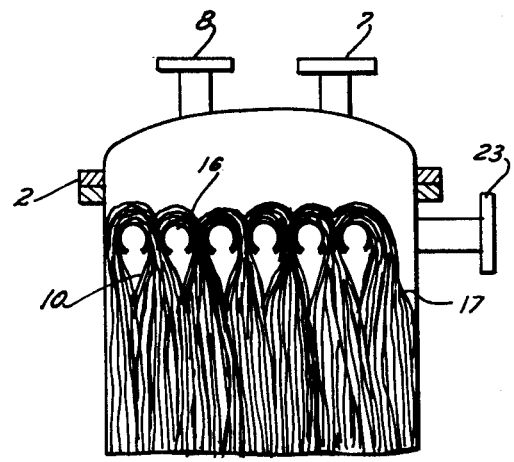
FIG. 3 is a longitudinal sectional view of an upper part of the brush filter.

FIG. 3 illustrates another embodiment of the filter housing 1 which has an additional outlet pipe connection for the back-flushing medium located at a side wall of the filter housing 1. A back-flushing tube 16 is located within the interior of the filter housing 1 and is provided with a number of holes for the fiber bundles 10. Such an arrangement guarantees effective distribution of the back-flushing medium along the filter housing 1 and among the fiber bundles 10.

Figure 4:
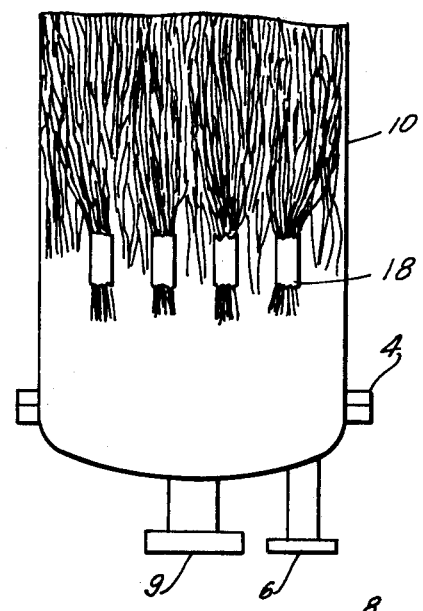
FIG. 4 is a longitudinal sectional view of a lower part of another embodiment of the brush filter.

FIG. 4 shows still another embodiment of the present invention. The separate fiber bundles 10 are provided with weights 18 fixed on the lower end portions of the corresponding fiber bundles 10. Obviously, the weights 18 do not permit any compression of the fiber bundles 10 against the support 12 under pressure of the contaminated medium flow passing the interior of the filter housing 1 in the direction from the inlet pipe connection 6 towards the outlet pipe connection 7.

The weights 18 are so arranged on the lower end portions of the fiber bundles 10 as to additionally compress the lower end portions of the fibers towards each other in a direction transverse to the direction of the contaminated medium flow through the filtering housing 1. It is to be seen from FIG. 4, that some of the end portions of the fibers are left uncompressed so as to increase the filtering effectiveness of the fiber bundles 10.

Figure 5:
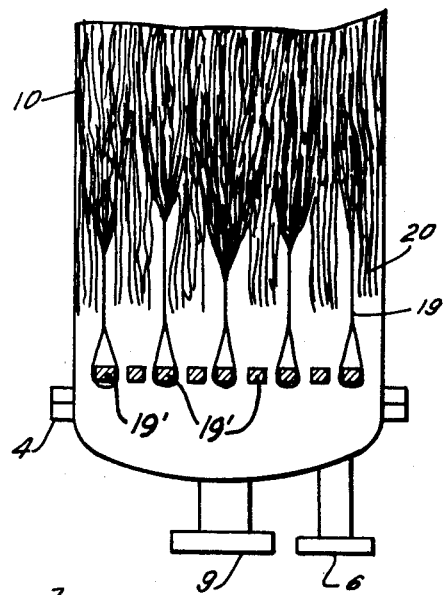
FIG. 5 is a longitudinal sectional view of a lower part of a third embodiment of the brush filter.

FIG. 5 shows another embodiment of the means for compressing together the lower end portions of the fibers. In accordance with this embodiment the lower end portions of some of the fibers are tied together in a number of separate bunches by strings 19. The strings 19 are further connected to projections 19' provided on the inner circumference of the filter housing 1. Instead of strings, there may be used springs for the same purpose. It is to be noted that some of the fibers are left with their lower end portions free similar to the arrangement shown in FIG. 4.

Figure 6:
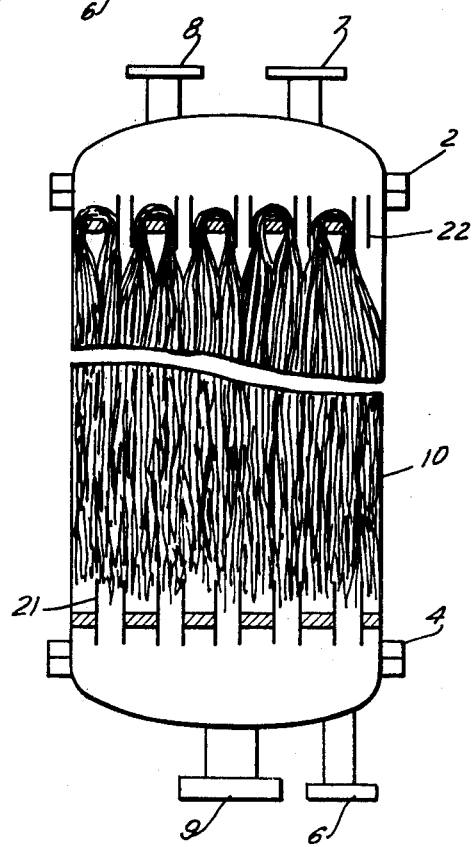
FIG. 6 is a longitudinal sectional view of a fourth embodiment of the brush filter.

The embodiment shown in FIG. 6 illustrates the filter housing provided with a number of inlet tubes 21 for the contaminated medium to be filtered and a number of inlet tubes 22 for the back-flushing medium. The inlet tubes 22 and 21 are shaped as nozzles. This is done in order to improve the distribution of the contaminated and back-flushing media within the interior of the filter housing 1 and between the fibers of the fiber bundles 10.

The contaminated medium is introduced into the interior of the filter housing 1 through the inlet pipe connection 6 by a pump, which is conventional and, therefore, is not shown for the sake of simplicity of the drawings. When the contaminated medium flows within the interior of the filter housing 1 along the fibers 14, 15 of the fiber bundles 10, the solid contaminated particles are arrested by the fibers 14 and 15. The filtered medium eventually leaves the filter housing through the outlet pipe connection 7. The filter cake is accumulated on the fibers 14 and 15 of the fiber bundles 10. The gradually increasing concentration of the filter cake on the fibers 14 and 15 leads to increase of the pressure inside the filter housing 1. When the concentration of the filter cake gets up to a predetermined level, a valve (not shown) in the inlet pipe connection 6 closes the latter. The back-flushing medium (e.g. liquid, gas or a mixture of both) is introduced into the interior of the filter housing 1 through the inlet pipe connection 8. The back-flushing medium removes the filter cake from the fibers 14 and 15, and withdraws the separated filter cake through the outlet pipe conduit 9. The brush filter in accordance with the present invention may be provided with the inlet pipe connection for the contaminated medium, located at the upper closure 3 and the outlet pipe connection for the contaminated medium, located at the lower closure 5. In this case, the contaminated medium flows downwardly, rather than upwardly, as discussed hereabove. The choice between the locations of the inlet and outlet pipe connections for the contaminated medium may be made empirically. However, it is advantageous so to locate the inlet and outlet pipe connections for the back-flushing medium that the back-flushing medium flows in the direction opposite to that of the contaminated medium. Should the contaminated medium flow downwardly (i.e., in the direction of the force of gravity), then the back-flushing medium (e.g. gas) flows upwardly. In this case, the back-flushing medium removes the filter cake from the lower end portions of the fibers more efficiently as opposed to the case where the back-flushing medium flows downwardly.

The brush filter in accordance with the present invention is especially useful in situations where it is necessary to separate relatively small particles from the contaminated medium. Such brush filter may be used, for example, for filtering water which previously was done by means of sand tanks. The brush filter may further be used for filtering salt solutions from which calcium and magnesium ingredients are to be removed in form of hydroxides prior to electrolysis. The length of the fiber bundles constitutes 800 mm. If the concentration of the solid matter in the flowable medium is 30–70 mg per liter, a throughput of the filter is 7 1 per $m^2$ and a service life (i.e. h) is 9 days.

In order to check the filtering effectiveness of the brush filter the filtered medium after exiting from the brush filter is submitted on a black diaphragm filter. During all 9 days no measurable filter cake has been accumulated on the black diaphragm filter.

The filtering effectiveness (i.e., quality of the filtered medium) depends on the number and thickness of the fibers. It is possible, therefore, by arranging a certain number of fibers in the brush filter to separate the contaminants completely from the contaminated medium. The fibers may be back-flushed later. The brush filter may be used for filtering radioactive dust from air or any other gas. In this case the fibers are back-flushed with liquid with subsequent separation of water. Thus, the brush filter in accordance with the present invention advantageously replaces known air filters for removing radioactive contaminants. If the brush filter of the present invention is used for this purpose, then after back-flushing a drying gas is introduced in the interior of the filter housing for drying the inner surface of the latter and the fibers. It is to be understood, that the possible use of the brush filter in accordance with the present invention is by no means limited to the hereabove discussed examples.

The fibers may be fixed on the support, in the known manner, as separate elements. The fibers may be back-flushed segmentwise, that is one group of the fibers after another. Such way of back-flushing the fibers is more effective for better separation of the filter cake accumulated on the fibers from the latter.

The fibers may be of synthetic plastic material. They may be of the same cross-sectional shape or of different cross-sectional shapes. Thus, they may be, for example, round or polygonal.

The fibers may have the same or different thickness. It is preferable to arrange fibers of different cross-sectional dimension (i.e. thickness and shape) in the same fiber bundles in order to increase the filtering efficiency of the fiber bundles during the filter process.

In order to facilitate separation of the contaminated particles from the contaminated medium during the filter process, it is especially advantageous to provide fibers having comparatively rough contacting surfaces. This can be done by way of subjecting the fibers to a chemical treatment prior or after the fibers have been installed in the filter housing.

It will be understood that each of the elements described above, or two or more together, may also find a useful application in other types of arrangements for and processes of filtering a contaminated medium differing from the types described above.

While the invention has been illustrated and described as embodied in an arrangement for and a process of filtering a contaminated medium, it is not intended to be limited to the details shown, since various modifications and structural changes may be made without departing in any way from the spirit of the present invention.

Without further analysis, the foregoing will so fully reveal the gist of the present invention that others may by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for filtering a contaminated medium, comprising the following steps:
   (a) connecting a plurality of elongated filtering fiber bundles to a support within a hollow filter housing, which housing has an inlet and an outlet spaced apart from each other, the location of the support and the location of the fibers being such that the fibers extend substantially parallel to a flow path extending from the inlet to the outlet and passing through the fiber bundles;
   (b) introducing a contaminated medium into the housing through the inlet and causing it to travel through the fiber bundles along the flow path, whereby the medium is filtered;
   (c) maintaining the orientation of the fiber bundles during the filtration process in substantially their original positions in a manner that the fiber bundles do not become compressed against the support; and
   (d) withdrawing the filtered medium from the housing through the outlet.

2. A process as defined in claim 1, wherein during said filtering step a filter cake accumulates on the fibers of said fiber bundles.

3. A process as defined in claim 2; and further comprising the step of introducing a back-flushing medium into the filter housing for back-flushing said fiber bundles to thereby separate the filter cake from said fibers of said fiber bundles.

4. A process as defined in claim 3; and further comprising the step of withdrawing said back-flushing medium and the filter cake separated from said fiber bundles away from said filter housing.

5. A process as defined in claim 4, wherein said filtering step lasts only until a predetermined amount of the filter cake is accumulated on the fiber bundles within said filter housing, said filter cake back-flushing step starting after said filtering step is over.

6. A process as defined in claim 4, wherein said back-flushing medium is introduced in said filter housing in a direction opposite to that of the contaminated medium flow in said filter housing.

7. A process as defined in claim 6, wherein said back-flushing medium is introduced in said filter housing from an upper portion thereof along the filter housing downwardly towards a lower portion thereof.

8. A process as defined in claim 7, wherein said back-flushing medium is introduced in said filter housing transversely relative to the elongation of said filter housing.

9. A process as defined in claim 3, wherein said back-flushing medium is gas.

10. A process as defined in claim 3, wherein said back-flushing medium is liquid.

11. A process as defined in claim 3, wherein said back-flushing medium is a mixture of gas and liquid.

12. The process of claim 3, wherein the plurality of fiber bundles is divided into a plurality of groups and wherein each group is individually backflushed and the groups are backflushed one after another in a predetermined sequence until all the groups have been backflushed.

13. A process as defined in claim 1, wherein said connecting step includes the step of fixing the fiber bundles in holes provided on said support.

14. The process of claim 1 wherein the fibers have roughened contacting surfaces whereby their filtering effectiveness in use is increased.

15. A filter for filtering a contaminated medium, comprising:
   (a) a hollow filter housing having an interior and further having a first inlet and a first outlet, the first inlet communicating with the interior of the housing whereby a contaminated medium may be introduced into the interior of the housing and the first outlet communicating with the interior of the housing whereby the medium may be withdrawn from the interior of the housing after the filtration process;
   (b) a support located within the interior of the housing;
   (c) a plurality of elongated filtering fibers located within the interior of the housing and being attached to the support in a manner that a flow path extending between the first inlet and the first outlet passes through the filtering fibers intermediate the inlet and outlet, whereby the medium is filtered as it passes along the flow path through the fibers; and
   (d) alignment means for maintaining the orientation of the filtering fiber in a direction parallel to the flow path during the filtration process, whereby the tendency of the filtering fibers to compress against the support during the filtration process is minimized.

16. An arrangement as defined in claim 15, wherein said fibers substantially fill said interior of said filter housing at least transversely relative to the elongation thereof.

17. An arrangement as defined in claim 15, wherein said fibers have a length between 300 and 2000 mm.

18. An arrangement as defined in claim 15, wherein said fibers are of synthetic plastic material.

19. An arrangement as defined in claim 15, wherein said fibers have relatively rough contacting surfaces for increasing the filtering effectiveness of the fibers during the filtering process.

20. The filter of claim 15, wherein the filters are grouped into a plurality of file bundles.

21. The filter of claim 20, wherein all fibers in each bundle are of equal length.

22. The filter of claim 20, wherein each bundle contains fibers of unequal length.

23. The filter of claim 20, wherein each fiber bundle has a first end and a second end, the first end being attached to the support and at least a portion of the second end being clasped together.

24. The filter of claim 23, wherein each clasped end is weighted, thereby counteracting any tendency of its corresponding fiber bundle to compress against the support during the filtration process and which weighted end thus serves as an alignment means.

25. The filter of claim 23, wherein each clasped end is secured to a corresponding projection fixed to the housing and located in the interior thereof by a string, which string counteracts any tendency of its corresponding fiber bundle to compress against the support during the filtration process and which string and projection thereby serve as an alignment means.

26. The filter of claim 23, wherein each clasped end is secured to a corresponding projection fixed to the housing and located in the interior thereof by a spring, which spring counteracts any tendency of its corresponding fiber bundle to compress against the support during the filtration process and which spring and projection thereby serve as an alignment means.

27. The filter of claim 15, wherein all the fibers are of equal diameter.

28. The filter of claim 15, wherein the fibers vary in diameter.

29. The filter of claim 15, wherein the housing includes a second inlet and a second outlet, each communicating with the interior of the housing, whereby a backflushing medium may be introduced into the housing through the second inlet for separating a filter cake from the filter fibers and the medium subsequently withdrawn from the housing along with the separated filter cake through the second outlet.

30. A filter for filtering a contaminated medium, comprising:
    (a) a hollow filter housing having an interior;
    (b) a first inlet located on the housing and communicating with the interior thereof, the first inlet having a plurality of nozzles, whereby a contaminated medium may be uniformly introduced into the interior of the housing through the nozzles and distributed evenly thereby;
    (c) a first outlet located on the housing and communicating with the interior thereof, the first outlet having a plurality of nozzles, whereby the medium may be uniformly withdrawn from the interior of the housing through the nozzles after the filtration process;
    (d) a support located within the interior of the housing;
    (e) a plurality of elongated filtering fibers located within the interior of the housing and being attached to the support in a manner that a flow path extending between the first inlet and the first outlet passes through the filtering fibers intermediate the inlet and outlet, whereby the medium is filtered as it passes along the flow path through the fibers; and
    (f) alignment means for maintaining the orientation of the filtering fibers in a direction parallel to the flow path during the filtration process, whereby the tendency of the filtering fibers to compress against the support during the filtration process is minimized.

31. The filter of claim 30, further including a second inlet and a second outlet, each communicating with the interior of the housing by a plurality of nozzles, whereby a backflushing medium may be uniformly introduced into the housing through the nozzles in the second inlet for separating a filter cake from the filter fibers and the medium subsequently uniformly withdrawn from the housing along with the separated filter cake through the nozzles in the second outlet.

* * * * *